United States Patent
White et al.

(10) Patent No.: US 10,498,398 B2
(45) Date of Patent: Dec. 3, 2019

(54) DATA SYNTHESIS USING NEAR FIELD COMMUNICATION

(71) Applicant: Walmart Apollo, LLC, Bentonville, AR (US)

(72) Inventors: Richard Andrew White, Pineville, MO (US); Ricky L. Lewis, Rogers, AR (US); Christopher Soames Johnson, Pea Ridge, AR (US); Jimmie Russell Clark, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/290,596

(22) Filed: Oct. 11, 2016

(65) Prior Publication Data

US 2017/0104512 A1   Apr. 13, 2017

Related U.S. Application Data

(60) Provisional application No. 62/240,309, filed on Oct. 12, 2015.

(51) Int. Cl.
| H04B 5/00 | (2006.01) |
| H04M 1/725 | (2006.01) |
| H04W 4/80 | (2018.01) |

(52) U.S. Cl.
CPC ...... *H04B 5/0031* (2013.01); *H04M 1/72566* (2013.01); *H04M 1/72583* (2013.01); *H04M 2250/04* (2013.01); *H04W 4/80* (2018.02)

(58) Field of Classification Search
CPC ............ G06F 17/30106; G06F 19/323; G06F 19/326; G06F 19/3431; G06F 19/3456;
(Continued)

(56) References Cited

U.S. PATENT DOCUMENTS 8,917,161 B2 * 12/2014 August ............... G06K 7/01
340/10.1
9,020,848 B1   4/2015 Ridge et al.
(Continued)

FOREIGN PATENT DOCUMENTS

DE   202013003141 U1   11/2013

OTHER PUBLICATIONS

NFC More—Android Apps on Google Play, https://play.google.com/store/apps/details?id=com.nfcteam.nfcmore&hl=en, viewed Jun. 2, 2015.
(Continued)

*Primary Examiner* — Yuwen Pan
*Assistant Examiner* — Paul P Tran
(74) *Attorney, Agent, or Firm* — McCarter & English, LLP; David R. Burns (57) ABSTRACT

Methods and systems are provided for synthesizing and displaying distributed data using Near Field Communication (NFC). A system includes a plurality of NFC-enabled mobile devices, a NFC base transmitter generating a Radio Frequency (RF) field, and a central computing device in electronic communication with the NFC base transmitter. Each NFC-enabled mobile device has a NFC payload encoding a unique user identifier that corresponds to a quantity of user data associated with a mobile application on that mobile device. The NFC base transmitter is configured to the NFC payload(s) of mobile devices being within a certain range of the RF field. The system is programmed to generate a plurality of user interface elements based on the quantities of user data, and instruct a display device to render a visual representation of each user interface element at display coordinates determined based on the quantities of user data.

18 Claims, 4 Drawing Sheets

(58) Field of Classification Search
CPC .... G06K 7/0008; G06K 7/01; G06K 19/0723;
G06K 19/07749; G06K 7/084; G06K
19/06196; G06K 19/08; G06K 19/083;
G06Q 10/06311; G06Q 10/063114; G06Q
10/06316; G06Q 10/06398; G06Q
10/087; G06Q 10/1091; G06Q 40/125;
G06Q 20/3278; G06Q 30/0627; G06Q
30/0643; G06Q 30/0631; G07C 1/10;
H03C 7/02; H04B 1/16; H04B 1/28;
H04B 1/3805; H04B 1/40; H04B 5/0012;
H04B 5/0031; H04B 5/0043; H04B
5/0062; H04B 5/0075; H04B 5/02; H04L
12/18; H04L 12/189; H04L 27/3455;
H04L 27/38; H04L 63/0823; H04L 63/20;
H04L 65/4038; H04L 67/04; H04L 67/18;
H04L 67/24; H04L 67/306; H04M
1/7253; H04M 1/72583; H04M 1/72566;
H04M 2250/04; H04W 4/008; H04W
4/021; H04W 4/043; H04W 4/06; H04W
4/20; H04W 4/206; H04W 8/005; H04W
12/04; H04W 12/06; H04W 52/24; H04W
52/245; H04W 52/281; H04W 72/042;
H04W 72/044; H04W 72/04; H04W
76/02; H04W 76/023; H04W 84/08;
H04W 84/18; H04W 88/06; H04W 88/08;
H04W 4/80
See application file for complete search history.

(56) References Cited

U.S. PATENT DOCUMENTS

| | | | |
|---|---|---|---|
| 9,380,626 B2* | 6/2016 | Tanabe | G06Q 20/3278 |
| 2006/0192018 A1* | 8/2006 | Tsai | G06K 7/084 |
| | | | 235/492 |
| 2009/0058647 A1* | 3/2009 | Dennard | G06Q 10/087 |
| | | | 340/572.1 |
| 2009/0323647 A1* | 12/2009 | Park | H04W 8/005 |
| | | | 370/338 |
| 2012/0102073 A1* | 4/2012 | Patel | H04L 51/043 |
| | | | 707/803 |
| 2013/0090966 A1 | 4/2013 | Rivere | |
| 2013/0314214 A1* | 11/2013 | Leica | H04W 4/008 |
| | | | 340/10.1 |
| 2014/0278638 A1 | 9/2014 | Kreuzkamp et al. | |
| 2014/0282066 A1 | 9/2014 | Dawson et al. | |
| 2014/0295757 A1* | 10/2014 | Kubota | A61B 5/0028 |
| | | | 455/41.1 |
| 2015/0106267 A1* | 4/2015 | Lee | G06O 20/42 |
| | | | 705/44 |
| 2015/0127733 A1* | 5/2015 | Ding | H04W 4/08 |
| | | | 709/204 |

OTHER PUBLICATIONS https://www.youtube.com/watch?v=NvB-fjzY7IQ, viewed Oct. 11, 2016.

* cited by examiner

ант device, any ISO/IEC 21481 compliant device.

DATA SYNTHESIS USING NEAR FIELD COMMUNICATION

CROSS-REFERENCE TO RELATED PATENT APPLICATIONS

This application claims priority to U.S. Provisional Application No. 62/240,309 filed on Oct. 12 2015, the content of which is hereby incorporated by reference in its entirety.

FIELD OF TECHNOLOGY

The present disclosure relate generally to data synthesis and more particularly to synthesis of distributed data using Near Field Communication (NFC).

BACKGROUND

Conventionally, software tools and other digital tools for use with distributed data can lack capabilities for physical interactions among the users. Examples of tools for use with distributed data include AGILE™ (Agile Software Corporation, San Jose, Calif.) and KANBAN® (Shore Labs, Katowice, Poland) software tools. The lack of physical interaction among the users of some tools can prevent formation of a psychological connection among the users. Formation of a psychological connection can help to build stronger ties among the users of the tool, and between the users and the work product developed using the tools.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As discussed above, tools for synthesizing and displaying distributed data conventionally lack capabilities for physical interaction with the users. Users may not form a psychological connection with each other, nor feel invested in the product from the processes being performed using the tool. As a result, the quality of the analysis, computation or other process being performed using the tools may be diminished. Accordingly, the example systems, methods, and apparatus herein provide tools that provide for greater user interaction that can help to build stronger ties among the users of the tool, and between the users and the work product developed using the tools. In addition, the example systems, methods, and apparatus herein provide an artifact or other indicia of a task once completed, which the SCRUM or other existing development tools may not be able to provide.

Methods and systems are provided herein for synthesizing and displaying distributed data using Near Field Communication (NFC). The methods and systems, in accordance with various embodiments, are configured to detect, using a NFC base transmitter, a NFC payload associated with one of a plurality of NFC-enabled mobile devices when the associated NFC-enabled mobile device is within a range of a Radio Frequency (RF) field generated by the NFC base transmitter. The NFC payload can, for example encode a unique user identifier corresponding to a quantity of user data associated with a mobile application resident on the associated NFC-enabled mobile device(s). The methods and systems can also be configured to transmit, using the NFC base transmitter, additional user data to the detected NFC-enabled mobile device for updating the quantity of user data and/or configured to receive, by the NFC base transmitter, the quantity of user data associated with the mobile application resident on the NFC-enabled mobile device in response to detection of the NFC payload.

The methods and systems can be configured to receive, at a central computing device in electronic communication with the NFC base transmitter, the received quantity of user data, the central computing device including a processor and a memory, the memory storing a plurality of received quantities of user data associated with a plurality of mobile applications resident on the plurality of NFC-enabled mobile devices. The systems and methods can be configured, in accordance with various embodiments, programmatically generate, by the processor, a plurality of user interface elements based on the plurality of received quantities of user data stored in the memory and configured to instruct, by the processor, a display device to render a visual representation of each user interface element at display coordinates determined based on the plurality of received quantities of user data. Thereby, the systems and methods provided herein are able to advantageously provide synthesizing and displaying distributed data using Near Field Communication (NFC).

Figure 1:
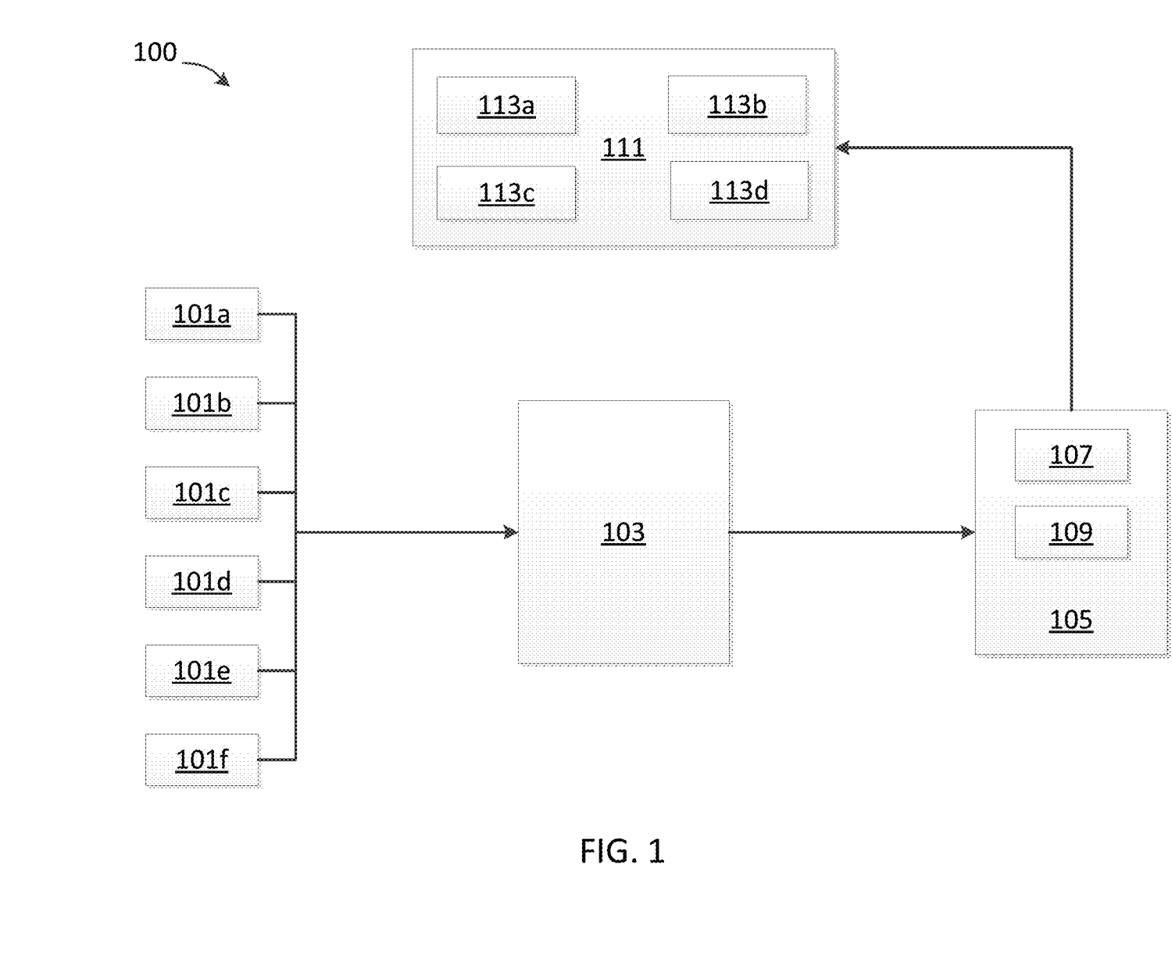
FIG. 1 is a block diagram showing a system for synthesizing and displaying distributed data using Near Field Communication (NFC) in accordance with various embodiments.

Referring now to FIG. 1, an exemplary system 100 for synthesizing and displaying distributed data using Near Field Communication (NFC) includes a plurality of NFC-enabled mobile-devices 101a-f each having an NFC payload encoding a unique user identifier associated therewith.

NFC-enabled mobile devices 101a-f in accordance with various embodiments, can include, for example, smartphones, tablets, laptops, employee badges, NFC card emulators, NFC readers, NFC writers, NFC peer-to-peer devices, NFC tags, any ECMA-340 compliant device, any ISO/IEC 18092 compliant device, any ECMA-352 compliant device, any ISO/IEC 21481 compliant device, and combinations thereof.

NFC base transmitter 103, in accordance with various embodiments, can include smartphones, tablets, laptops, NFC card emulators, NFC readers, NFC writers, NFC peer-to-peer devices, any ECMA-340 compliant device, any ISO/IEC 18092 compliant device, any ECMA-352 compliant device, any ISO/IEC 21481 compliant device.

Central computing device 105 can include, for example, a desktop computer, a laptop computer, a tablet, a smartphone, a server, a computing cloud, combinations thereof, or any other suitable device or devices capable of electronic communication with an NFC base transmitter 103 and having a processor 107 and a memory 109. Processor 107, in accordance with various embodiments can include, for example, but is not limited to, a microchip, a processor, a microprocessor, a special purpose processor, an application specific integrated circuit, a microcontroller, a field programmable gate array, any other suitable processor, or combinations thereof. Memory 109, in accordance with various embodiments can include, for example, but is not limited to, hardware memory, non-transitory tangible media, magnetic storage disks, optical disks, flash drives, computational device memory, random access memory, such as but not limited to DRAM, SRAM, EDO RAM, any other type of memory, or combinations thereof.

Display device 111, in accordance with various embodiments, can include, for example, a LED monitor, a LCD monitor, a television, a CRT monitor, a touchscreen, a computer monitor, a touchscreen monitor, a screen or display of a mobile device (such as but not limited to, a smartphone, a tablet, or an electronic book), and/or any other display device.

An example use of the system 100 for synthesizing and displaying distributed data using Near Field Communication (NFC) is described. Each of the NFC-enabled mobile devices 101a-f is configured to include a NFC payload that encodes an associated unique user identifier. Each of the unique user identifiers corresponds to a quantity of user data associated with a mobile application. The mobile application is be resident on each of the NFC-enabled mobile devices 101a-f. The quantity of user data can be any size or amount of data that is to be used for analysis, computation or other process being performed in the distributed data environment.

The NFC base transmitter 103 is configured to detect the NFC payload of any of the NFC-enabled mobile devices 101a-f disposed within a certain range of a Radio Frequency (RF) field generated by the NFC base transmitter 103. In response to the detection, the NFC base transmitter 103 is also configured to transmit additional user data to the NFC-enabled mobile device 101a-f for updating the quantity of user data, or receive from the NFC-enabled mobile device 101a-f the quantity of user data associated with the mobile application.

The memory 109 of the central computing device 105 stores the quantity of user data received from each NFC-enabled mobile device 101a-f as well as processor-executable instructions. The processor 107 is configured to execute the processor-executable instructions to generate a plurality of user interface elements based on the quantities of user data stored in the memory 109 and instruct the display device 111 to render a visual representation of user interface elements 113a-d at display coordinates of the determined based on the quantities of user data.

In an example, at least one of the user interface elements 113a-d can be visually represented as a virtual sticky note.

In an example, the processor 107 also can be configured to execute the processor-executable instructions to update at least one of the previously created user interface element, or to create a new user interface element, or both.

By way of non-limiting example, in one application of the technology described herein, the user data included in the NFC payload can include task assignment status data, along with the unique user identifier. For example, the task assignment status data can include data indicative of the status (including a change in progress) of tasks currently assigned to a user, based on the quantity of user data associated with the mobile application. A user interface of the mobile application can be configured to render at least one graphical representation, or other visual representation, of the task assignment status data. The user interface can be configured to issue a notification for at least one task that is at risk of not meeting a preset timeline based on the task assignment status data.

In an example, the quantity of user data can include user-assigned task related data. The user-assigned task-related data can include, as non-limiting examples, at least one of a status identifier, a completion percentage, a predicted completion date, user velocity, or task relationship data.

The example system 100 can include at least one additional NFC base transmitter in electronic communication with the central computing device 105. The at least one additional NFC base transmitter can be located in the same geographical area as the NFC base transmitter 103 or in a different geographical location than the NFC base transmitter 103.

The example system 100 can include at least one additional display device, in electronic communication with the central computing device 105. The at least one additional display device can be located in the same geographical area as the display device 111, or in a different geographical location than the display device 111.

Figure 2:
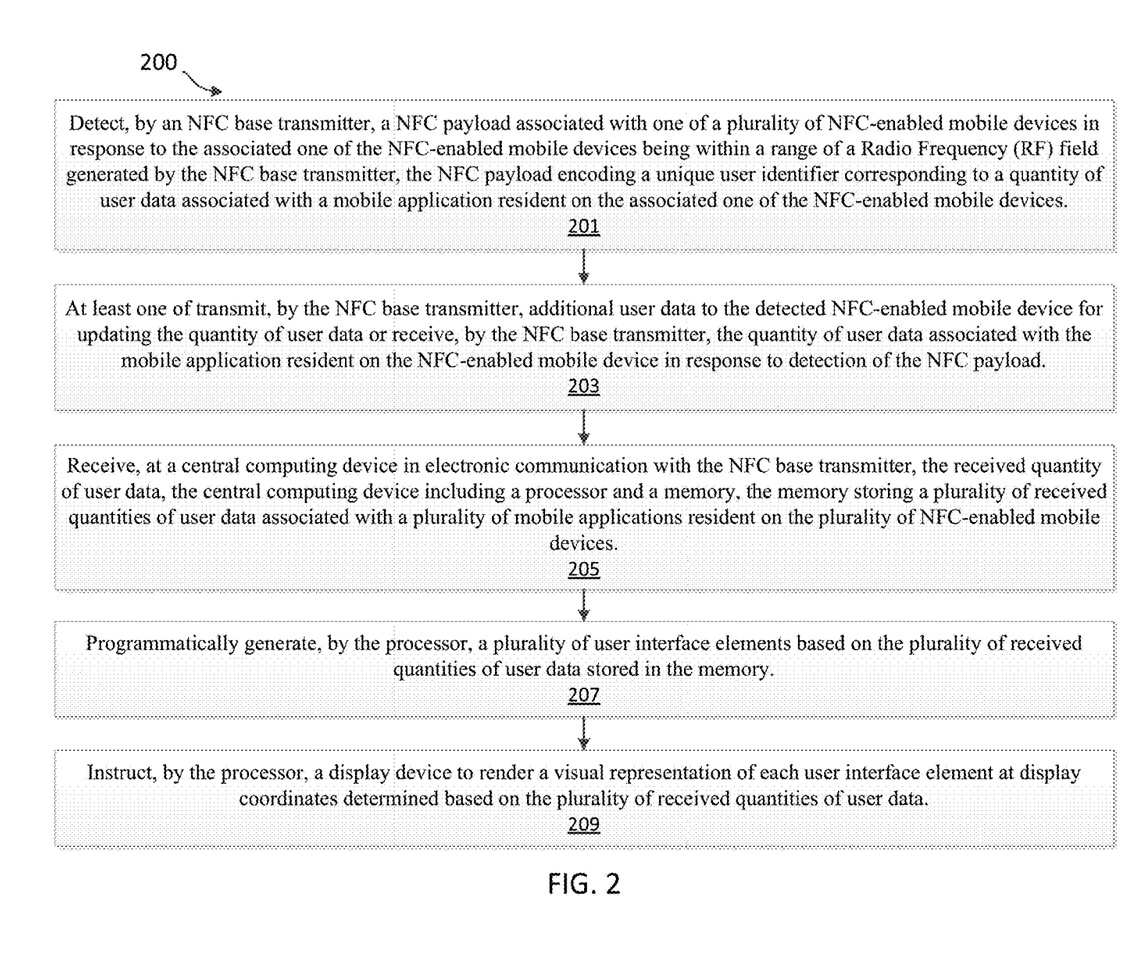
FIG. 2 is a flow diagram illustrating a method for synthesizing and displaying distributed data using Near Field Communication (NFC) in accordance with various embodiments.

Referring now to FIG. 2, a method 200 is provided for synthesizing and displaying distributed data using Near Field Communication (NFC). The method includes a step 201 of detecting, by an NFC base transmitter, a NFC payload associated with one of a plurality of NFC-enabled mobile devices in response to the associated one of the NFC-enabled mobile devices being within a range of a Radio Frequency (RF) field generated by the NFC base transmitter, the NFC payload encoding a unique user identifier corresponding to a quantity of user data associated with a mobile application resident on the associated one of the NFC-enabled mobile devices. The method also includes a step 203 of at least one of transmitting, by the NFC base transmitter, additional user data to the detected NFC-enabled mobile device for updating the quantity of user data or receiving, by the NFC base transmitter, the quantity of user data associated with the mobile application resident on the NFC-enabled mobile device in response to detection of the NFC payload. The method also includes a step 205 of receiving, at a central computing device in electronic communication with the NFC base transmitter, the received quantity of user data, the central computing device including a processor and a memory, the memory storing a plurality of received quantities of user data associated with a plurality of mobile applications resident on the plurality of NFC-enabled mobile devices. The method also includes a step 207 of programmatically generating, by the processor, a plurality of user interface elements based on the plurality of received quantities of user data stored in the memory. The method also includes a step 209 of instructing, by the processor, a display device to render a visual representation of each user interface element at display coordinates determined based on the plurality of received quantities of user data.

Any example NFC base transmitter, such as but not limited to the NFC base transmitter 103 described above with reference to FIG. 1, can be used to perform step 201, for detecting the NFC payload associated with one of a plurality of NFC-enabled mobile devices in response to the associated one of the NFC-enabled mobile devices being within a range of a Radio Frequency (RF) field generated by the NFC base transmitter, the NFC payload encoding a unique user identifier corresponding to a quantity of user data associated with a mobile application resident on the associated one of the NFC-enabled mobile devices.

The example NFC base transmitter also can be used to perform step 203, to transmit additional user data to the detected NFC-enabled mobile device for updating the quantity of user data, or to receive the quantity of user data associated with the mobile application resident on the NFC-enabled mobile device in response to detection of the NFC payload, or both.

An example central computing device, such as but not limited to the central computing device 111 described above with reference to FIG. 1, can be disposed in electronic communication with the NFC base transmitter 103 to perform step 201, for receiving the quantity of user data received at the NFC base transmitter 103. The central computing device include a processor 107 and a memory 109 to store a plurality of received quantities of user data associated with a plurality of mobile applications resident on the plurality of NFC-enabled mobile devices.

An example processor, such as but not limited to the processor 109 described above with reference to FIG. 1, can be used to perform step 207 for programmatically generating a plurality of user interface elements based on the plurality of received quantities of user data stored in the memory can be performed.

The example processor also can be used to perform step 209, for instructing a display device to render a visual representation of each user interface element at display coordinates determined based on the plurality of received quantities of user data.

An example method for synthesizing and displaying distributed data using Near Field Communication (NFC) can further include detecting, by at least one additional NFC base transmitter, an additional NFC payload associated with an additional one of the plurality of NFC-enabled mobile devices in response to the associated additional one of the NFC-enabled mobile devices being within a range of an additional Radio Frequency (RF) field generated by the NFC base transmitter, the additional NFC payload encoding an additional unique user identifier corresponding to an additional quantity of user data associated with an additional mobile application resident on the associated additional one of the NFC-enabled mobile devices. The example method can further include transmitting, by the additional NFC base transmitter, additional user data to the detected additional one of the plurality of NFC-enabled mobile devices for updating the additional quantity of user data, or receiving, by the additional NFC base transmitter, the additional quantity of user data associated with the additional mobile application resident on the additional NFC-enabled mobile device in response to detection of the additional NFC payload, or both. An example central computing device in electronic communication with the additional NFC base transmitter can be used to receive the received additional quantity of user data.

Exemplary Computing Devices

Figure 3:
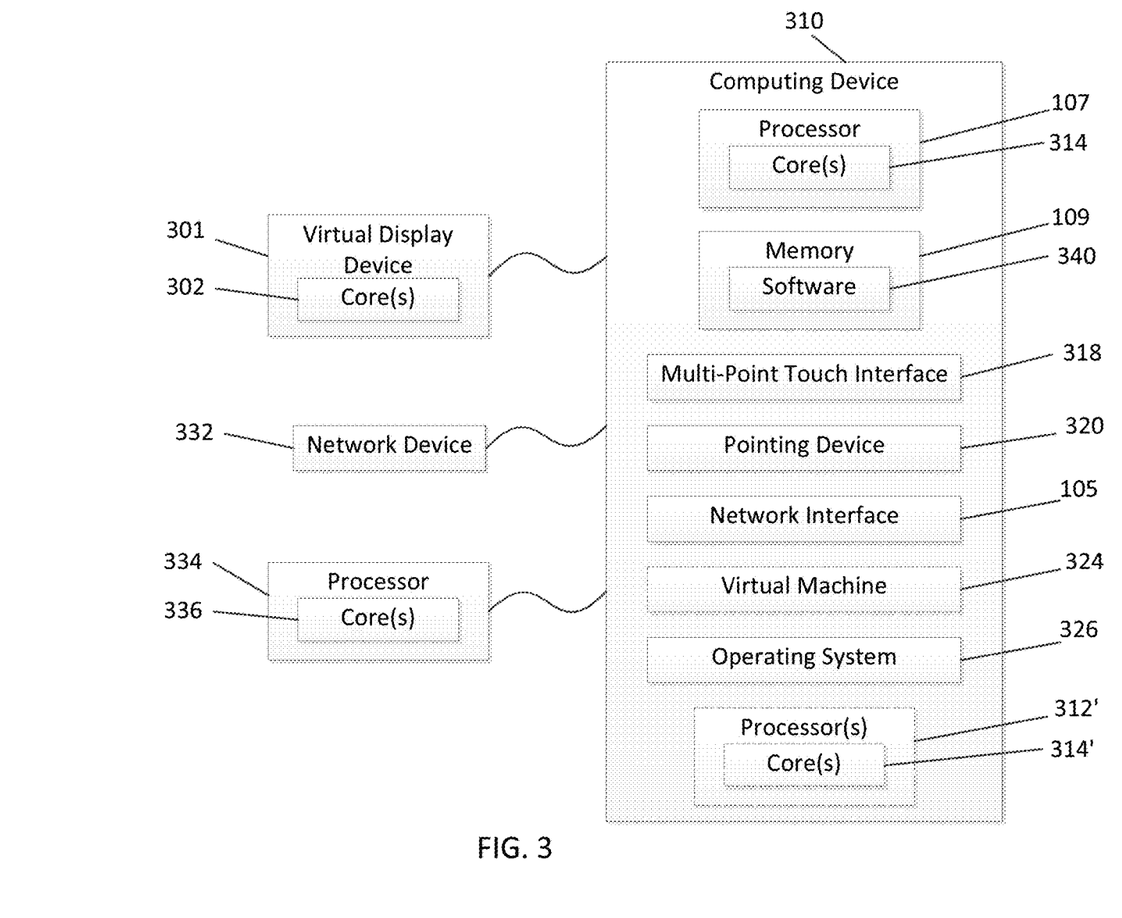
FIG. 3 is an example computational device block diagram depicting various components which can be used to implement various of the disclosed embodiments.

FIG. 3 is a block diagram of an exemplary computing device 310 such as can be used, or portions thereof, in accordance with various embodiments and, for clarity, refers back to and provides greater detail regarding various elements of the system 100 of FIG. 1. The computing device 310 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 109 included in the computing device 310 can store computer-readable and computer-executable instructions or software for performing the operations disclosed herein. For example, the memory 109 can store a software application 340 which is configured to perform various of the disclosed operations (e.g., generating a plurality of user interface elements 113a-d based on the quantities of data stored in the memory 109 and instructing a display device 111 to render a visual representation of each user interface elements 113a-d at display coordinates determined based on the quantities of user data). The computing device 310 can also include configurable and/or programmable processor 107 and an associated core 314, and optionally, one or more additional configurable and/or programmable processing devices, e.g., processor(s) 312' and associated core(s) 314' (for example, in the case of computational devices having multiple processors/cores), for executing computer-readable and computer-executable instructions or software stored in the memory 109 and other programs for controlling system hardware. Processor 107 and processor(s) 312' can each be a single core processor or multiple core (314 and 314') processor.

Virtualization can be employed in the computing device 310 so that infrastructure and resources in the computing device can be shared dynamically. A virtual machine 324 can be provided to handle a process running on multiple processors so that the process appears to be using only one computing resource rather than multiple computing resources. Multiple virtual machines can also be used with one processor.

Memory 109 can include a computational device memory or random access memory, such as DRAM, SRAM, EDO RAM, and the like. Memory 109 can include other types of memory as well, or combinations thereof.

A user can interact with the computing device 310 through a visual display device 328, such as a computer monitor, which can display one or more user interfaces 330 that can be provided in accordance with exemplary embodiments. The computing device 310 can include other I/O devices for receiving input from a user, for example, a keyboard or any suitable multi-point touch interface 318, a pointing device 320 (e.g., a mouse). The keyboard 318 and the pointing device 320 can be coupled to the visual display device 328. The computing device 310 can include other suitable conventional I/O peripherals.

The computing device 310 can also include one or more storage devices 334, such as a hard-drive, CD-ROM, or other computer readable media, for storing data and computer-readable instructions and/or software that perform operations disclosed herein. Exemplary storage device 334 can also store one or more databases for storing any suitable information required to implement exemplary embodiments. The databases can be updated manually or automatically at any suitable time to add, delete, and/or update one or more items in the databases.

The computing device 310 can include a network interface 322 configured to interface via one or more network devices 332 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 322 can include a built-in network adapter, network interface card, PCMCIA network card, card bus network adapter, wireless network adapter, USB network adapter, modem or any other device suitable for interfacing the computing device 310 to any type of network capable of communication and performing the operations described herein. Moreover, the computing device 310 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 310 can run any operating system 326, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 326 can be run in native mode or emulated mode. In an exemplary embodiment, the operating system 326 can be run on one or more cloud machine instances.

Figure 4:
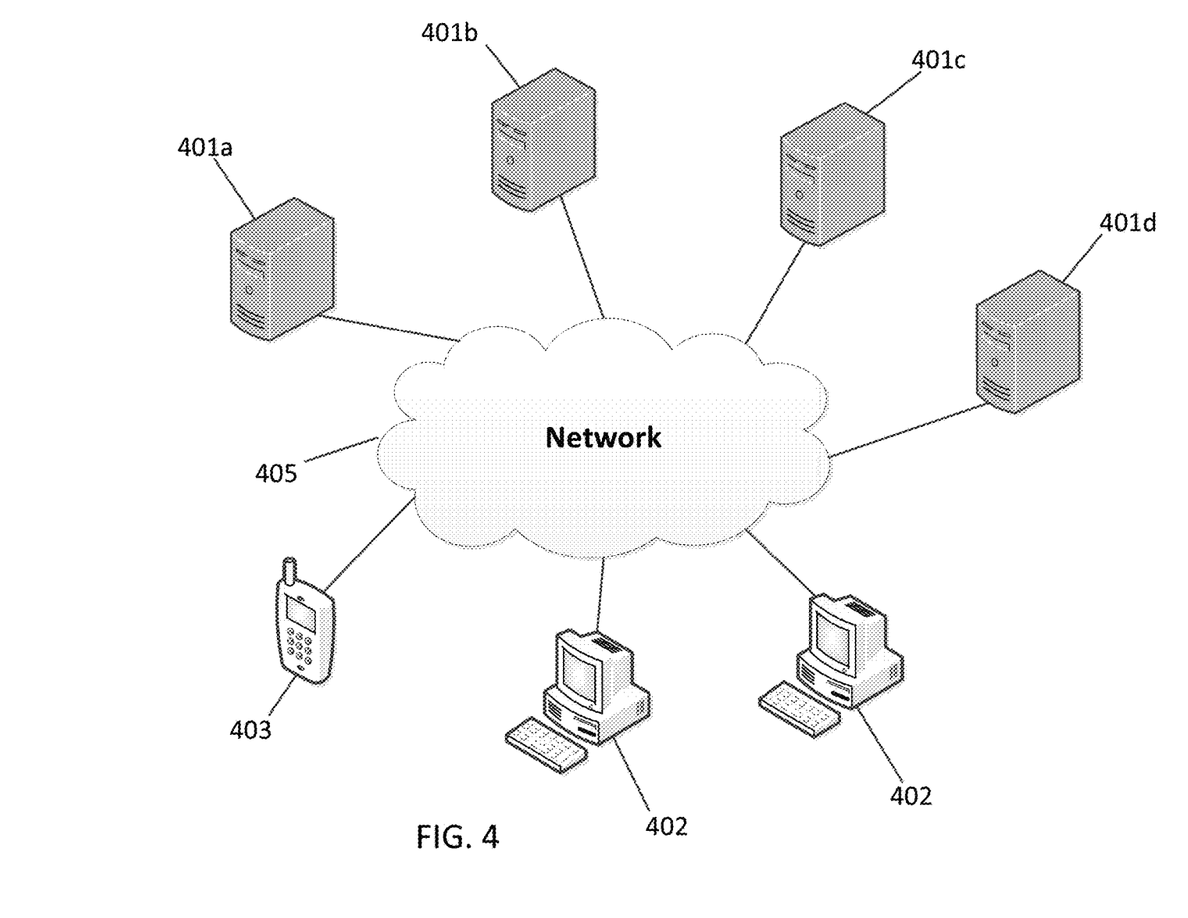
FIG. 4 is an example computational device block diagram depicting various components which can be used to implement various of the disclosed embodiments in a distributed system.

FIG. 4 is an example computational device block diagram of certain distributed embodiments. Although FIG. 1, and portions of the exemplary discussion above, make reference to a centralized system 100 operating on a single computing device, one will recognize that various of the modules within the system 100 may instead be distributed across a network 405 in separate server systems 401*a-d* and possibly in user systems, such as a desktop computer device 402, or mobile computer device 403. As one example, users may download an application to their desktop computer device or mobile computer device, which is configured to operate as the central computing device 105. As another example, the user interface elements 113*a-d* can be included in a client side application of a client-server environment, wherein the central computing device 105 is hosted by a server and interacted with by the desktop computer device or mobile device. In some distributed systems, the modules of the system 100 can be separately located on server systems 401*a-d* and can be in communication with one another across the network 405.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for synthesizing and displaying distributed data using Near Field Communication (NFC) comprising:

a plurality of NFC-enabled mobile devices, each NFC-enabled mobile device having a NFC payload encoding a unique user identifier associated therewith, each one of the unique user identifiers corresponding to a quantity of user data associated with a mobile application resident on the associated one of the NFC-enabled mobile devices, the user data relating to tasks currently assigned to a user of the NFC-enabled mobile device having the unique user identifier associated therewith;

a NFC base transmitter generating a Radio Frequency (RF) field, the NFC base transmitter configured to detect an associated one of the NFC payloads in response to one or more of the NFC-enabled mobile devices being within a range of the RF field, the NFC base transmitter further configured to at least one of transmit additional user data to the detected NFC-enabled mobile device for updating the quantity of user data or receive the quantity of user data associated with the mobile application from the NFC-enabled mobile device in response to detection of the NFC payload; and a central computing device in electronic communication with the NFC base transmitter, the central computing device including a processor and a memory, the memory storing each quantity of user data received from each NFC-enabled mobile device and instructions that, when executed by the processor:

programmatically generate a plurality of user interface elements based on the quantities of user data stored in the memory received from the plurality of NFC-enabled mobile devices, and instruct a display device to render a visual representation of each user interface element at display coordinates determined based on the quantities of user data, wherein each quantity of user data includes user-assigned task related data and the user-assigned task related data includes a status identifier, a completion percentage, and a predicted completion date of the tasks currently assigned to the user.

2. The system of claim 1, wherein programmatically generating the plurality of user interface elements further comprises updating at least one previously created user interface element.

3. The system of claim 1, wherein programmatically generating the plurality of user interface elements further comprises creating a new user interface element.

4. The system of claim 1, wherein at least one of the user interface elements is visually represented as a virtual sticky note.

5. The system of claim 1, wherein the user-assigned task-related data includes task relationship data.

6. The system of claim 1, further comprising at least one additional NFC base transmitter in electronic communication with the central computing device.

7. The system of claim 6, wherein the at least one additional NFC base transmitter is located in a different geographical location than the NFC base transmitter.

8. The system of claim 1, further comprising at least one additional display device, in electronic communication with the central computing device.

9. The system of claim 8, wherein the at least one additional display device is located in a different geographical location than the display device.

10. A method for synthesizing and displaying distributed data using Near Field Communication (NFC) comprising:
   detecting, by an NFC base transmitter, a NFC payload associated with one of a plurality of NFC-enabled mobile devices in response to the associated one of the NFC-enabled mobile devices being within a range of a Radio Frequency (RF) field generated by the NFC base transmitter, the NFC payload encoding a unique user identifier corresponding to a quantity of user data associated with a mobile application resident on the associated one of the NFC-enabled mobile devices, the user data relating to tasks currently assigned to a user of the NFC-enabled mobile device having the unique user identifier associated therewith;
   at least one of transmitting, by the NFC base transmitter, additional user data to the detected NFC-enabled mobile device for updating the quantity of user data or receiving, by the NFC base transmitter, the quantity of user data associated with the mobile application resident on the NFC-enabled mobile device in response to detection of the NFC payload;
   receiving, at a central computing device in electronic communication with the NFC base transmitter, the received quantity of user data, the central computing device including a processor and a memory, the memory storing a plurality of received quantities of user data associated with a plurality of mobile applications resident on the plurality of NFC-enabled mobile devices;
   programmatically generating, by the processor, a plurality of user interface elements based on the plurality of received quantities of user data stored in the memory received from the plurality of NFC-enabled mobile devices; and
   instructing, by the processor, a display device to render a visual representation of each user interface element at display coordinates determined based on the plurality of received quantities of user data, wherein each quantity of user data includes user-assigned task related data and the user-assigned task related data includes a status identifier, a completion percentage, and a predicted completion date of the tasks currently assigned to the user.

11. The method of claim 10, wherein programmatically generating the plurality of user interface elements further comprises updating at least one previously created user interface element.

12. The method of claim 10, wherein programmatically generating the plurality of user interface elements further comprises creating a new user interface element.

13. The method of claim 10, further comprising modifying, in response to receiving a user input at a user interface of at least one of the plurality of the NFC-enabled mobile devices, at least a portion of the quantity of user data.

14. The method of claim 10, wherein the user-assigned task-related data includes task relationship data.

15. The method of claim 10, further comprising:
   detecting, by at least one additional NFC base transmitter, an additional NFC payload associated with an additional one of the plurality of NFC-enabled mobile devices in response to the associated additional one of the NFC-enabled mobile devices being within a range of an additional Radio Frequency (RF) field generated by the NFC base transmitter, the additional NFC payload encoding an additional unique user identifier corresponding to an additional quantity of user data associated with an additional mobile application resident on the associated additional one of the NFC-enabled mobile devices;
   at least one of transmitting, by the additional NFC base transmitter, additional user data to the detected additional one of the plurality of NFC-enabled mobile devices for updating the additional quantity of user data or receiving, by the additional NFC base transmitter, the additional quantity of user data associated with the additional mobile application resident on the additional NFC-enabled mobile device in response to detection of the additional NFC payload;
   receiving, at the central computing device in electronic communication with the additional NFC base transmitter, the received additional quantity of user data.

16. The method of claim 15, wherein the at least one additional NFC base transmitter is located in a different geographical location than the NFC base transmitter.

17. The method of claim 10, further comprising instructing, by the processor, at least one additional display device to render the visual representation of each user interface element.

18. The method of claim 17, wherein the at least one additional display device is located in a different geographical location than the display device.

* * * * *